K. ROSAK.
METHOD OF MANUFACTURING COUNTER PIECES TO GAUGES, FORMED BARS, PROFILE PIECES, AND THE LIKE.
APPLICATION FILED AUG. 14, 1919.
1,423,154.
Patented July 18, 1922.
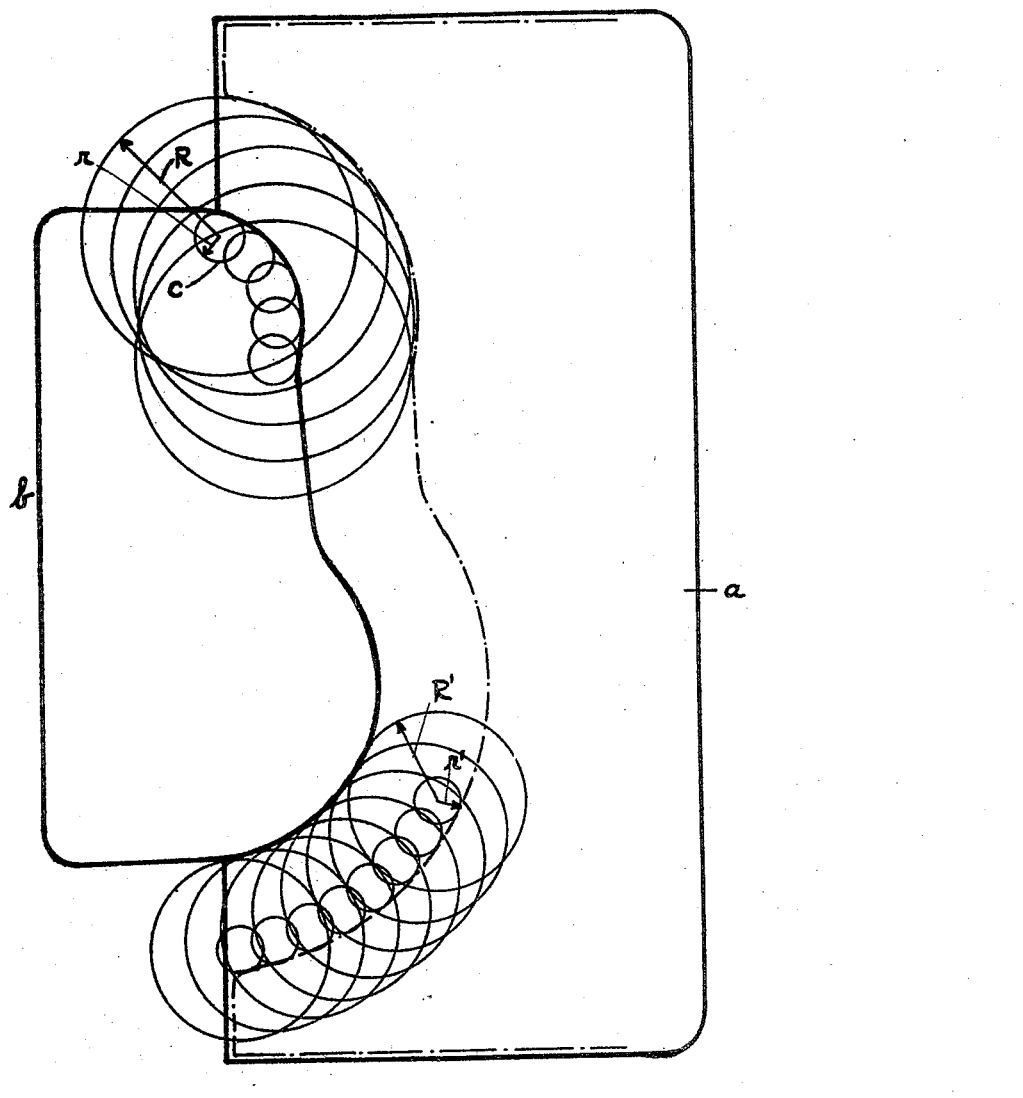
Inventor:
K. Rosak
per F. Dittmar
Attorney.

UNITED STATES PATENT OFFICE.

KARL ROSAK, OF BERLIN, GERMANY.

METHOD OF MANUFACTURING COUNTER PIECES TO GAUGES, FORMED BARS, PROFILE PIECES, AND THE LIKE.

1,423,154. Specification of Letters Patent. Patented July 18, 1922.

Application filed August 14, 1919. Serial No. 317,598.

(GRANTED UNDER THE PROVISIONS OF THE ACT OF MARCH 3, 1921, 41 STAT. L., 1313.)

*To all whom it may concern:*

Be it known that I, KARL ROSAK, mechanical engineer, a citizen of the Czecho-Slovak Republic, residing at Berlin, NW. 87, Wullenweberstrasse 6, in the State of Germany, have invented certain new and useful Improvements in or Relating to a Method of Manufacturing Counter Pieces to Gauges, Formed Bars, Profile Pieces, and the like (for which I have filed applications in Germany May 7, 1918, Patent No. 309,434), of which the following is a specification.

The manufacture of counter-pieces to gauges, profile-pieces, formed-bars and the like by means of simply operating a copying milling machine has heretofore not been possible. A profile-piece can be obtained from a similar profile-piece by means of a copying milling machine when the diameter of the guide-finger corresponds to that of the milling cutter and when the guide-finger engages with the profile-piece on the same side as the cutter engages with the work-piece. On the other hand this proceeding is not available for making counter-pieces as in this case the cutter works on a surface opposite to that on which the finger is moving and in consequence a curve is produced which does not cover that of the pattern-piece, being merely equidistant to it: accordingly a counter-piece cannot be obtained by means of the ordinary proceeding.

The present invention avoids this drawback by copying at first from the original gauge, profile-piece, etc., an auxiliary gauge the contour of which differs from the contour of the original piece by the difference of the radii of the cutter and the guide-finger, whereupon from this auxiliary gauge the proper counter-piece is made in such a way that the sum of the radii of cutter and guide-finger used for manufacturing the counter-piece is equal to the difference of the radii of cutter and finger employed for making the auxiliary gauge.

The drawing diagrammatically shows an instance of the proceeding according to the present invention. In this drawing $a$ is the original pattern-piece to which a counter-piece $b$ is to be made. For this purpose a gauge of the form shown by the dot and dash-line is to be made at first. This job is done on a copying milling machine, a guide finger $c$ of the radius $r$ being moved along the original pattern-piece $a$ and a milling cutter of the radius R being made to work on the same side. Hereby the gauge of the dot and dash-line shape is formed which is equidistant to the curve of the original pattern-piece with the amount $R-r$.

This auxiliary gauge serves for making the counter-piece $b$, the guide finger being moved along the former and the milling cutter being made to work on the opposite side. Another proportion between the radii of the finger and the cutter must now be adopted, as the curve produced in this operation is with $R^1+r^1$ distant from the contour of the auxiliary gauge, $R^1$ and $r^1$ being the radii of the cutter and the finger respectively employed in the second operation. The counter-piece exactly fits to the original pattern-piece $a$, when the distance between the auxiliary gauge and the curve obtained in the second operation is exactly the same as that between the auxiliary gauge and the original pattern-piece or with other words, when the condition $$R-r=R^1+r^1$$

is fulfilled.

Three of this 4 units may be freely chosen and the fourth is to be calculated so that by strictly keeping within the size of the cutter or another tool used an exact counter-piece is obtained.

Having now described my invention what I claim is:—

A method of manufacturing counter-pieces to gauges, former-bars, profile-pieces and the like consisting in an auxiliary-gauge being at first copied from a pattern-piece gauge or the like, the operative edge of which is uniformly removed from that of the pattern-piece a distance equal to the difference between the radii of the copying tool and the guide-finger, and from this auxiliary gauge the proper counter-piece being copied by means of a milling cutter and a guide-finger the diameters of which are chosen in such a way that the sum of the radii of the same equals the difference of the radii of the tool and the guide-finger employed for making the auxiliary gauge.

In testimony whereof I have affixed my signature in presence of two witnesses.

KARL ROSAK.

Witnesses:
  ZEMOS ZROCH,
  AMOR THU.